United States Patent [19]

Uchida et al.

[11] 4,129,374
[45] Dec. 12, 1978

[54] ELECTROPHOTOGRAPHIC COPYING MACHINE HAVING MOVING CARRIER FOR ORIGINAL

[75] Inventors: Katsuzo Uchida, Yamatokoriyama; Hiroaki Uchiyama, Nara; Akira Mitsuyama, Yamatokoriyama, all of Japan

[73] Assignee: Sharp Kabushiki Kaisha, Osaka, Japan

[21] Appl. No.: 742,448

[22] Filed: Nov. 17, 1976

[30] Foreign Application Priority Data

Nov. 18, 1975 [JP] Japan .......................... 50-157126[U]

[51] Int. Cl.² ............................................ G03G 15/28
[52] U.S. Cl. ...................................................... 355/8
[58] Field of Search .................... 355/133, 3 R, 8, 75, 355/48–51; 160/345; 16/88, 96 R, 97, 93 R

[56] References Cited

U.S. PATENT DOCUMENTS

| | | |
|---|---|---|
| 2,757,804 | 8/1956 | Sadwin ................. 16/87.6 R X |
| 2,759,215 | 8/1956 | Arnit ......................... 16/96 R |
| 2,963,753 | 12/1960 | Seaburg ..................... 16/88 X |
| 3,138,830 | 6/1964 | Scharge ...................... 16/88 X |
| 3,457,676 | 7/1969 | Ziegler ................... 16/93 R X |
| 3,672,762 | 6/1972 | Suzuki et al. ............... 355/8 X |
| 3,751,158 | 8/1973 | Komori .......................... 355/8 |

*Primary Examiner*—Donald A. Griffin
*Attorney, Agent, or Firm*—Birch, Stewart, Kolasch and Birch

[57] ABSTRACT

In an electrophotographic copying machine having a reciprocating original carrier, a metal frame having a substantially U-shaped section is fixed to one side edge of a transparent glass platen. A pair of guide rails are provided at both sides of the copying machine body, one for slidably accommodating the U-shaped metal frame and the other for slidably supporting the bottom wall of the transparent glass platen at the opposite side edge to the side where the U-shaped metal frame is fixed.

9 Claims, 6 Drawing Figures

ELECTROPHOTOGRAPHIC COPYING MACHINE HAVING MOVING CARRIER FOR ORIGINAL

BACKGROUND OF THE INVENTION

The present invention relates to an electrophotographic copying machine of the original carrier reciprocating type and, more particularly, to a mechanism for supporting and transporting the original carrier in the electrophotographic copying machine.

In the conventional original carrier transporting mechanism, the travel of the original carrier is not completely stable, because the friction load varies depending on the location of the original carrier. Moreover, the original carrier tilts with respect to the copying maching housing when the original carrier reaches its end portion of travel. This causes distortion of the printed image.

Accordingly, an object of the present invention is to provide a novel travelling carrier for original in an electrophotograhic copying machine.

Another object of the present invention is to provide a mechanism for supporting and transporting an original carrier in an electrophotographic copying machine, which ensures stable travel of the original carrier.

Other objects and further scope of applicability of the present invention will become apparent from the detailed description pg,3 given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objects, pursuant to an embodiment of the present invention, a metal frame having a substantially U-shaped section is fixed to one side edge of a transparent glass platen. A pair of guide rails are provided at both sides of the copying machine body, one for slidably accommodating the U-shaped metal frame via rolling balls, and the other for slidably supporting the bottom wall of the transparent glass platen at the opposite side edge to the side where the U-shaped metal frame is fixed via rolling balls. A rack is fixed to the U-shaped metal frame for transportation purposes.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DESCRIPTION OF THE PREFERRED EMBODIMENTS

Figure 1:
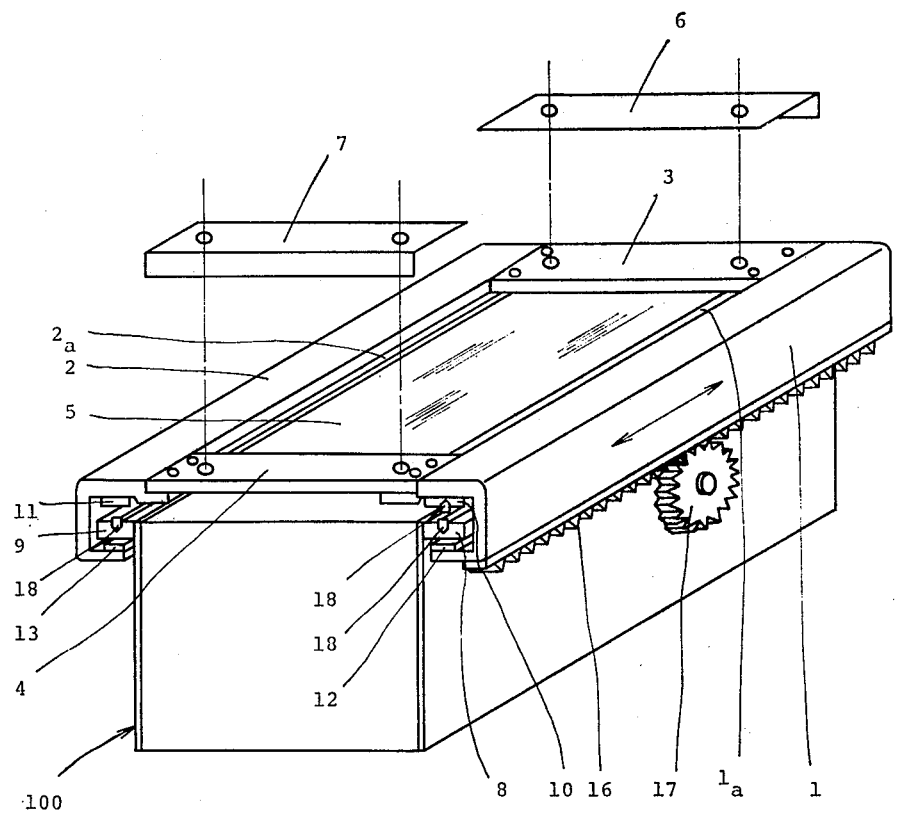
FIG. 1 is a perspective view of an original carrier of an electrophotographic copying machine of the prior art.

Referring now in detail to the drawings, and to facilitate a more complete understanding of the present invention, an example of the original carrier of an electrophotographic copying machine of the prior art will be first described with reference to FIGS. 1 through 3.

A pair of metal frames 1, 2 having substantially U-shaped section are connected to each other via a pair of connection plates 3, 4 in such a manner as to form a rectangular frame for securing a transparent platen 5 therein. The transparent platen 5 is secured on stepped portions 1a and 2a of the U-shaped metal frames 1 and 2, respectively, and then tightly fixed through the use of screws and fixing plates 6 and 7.

The above constructed original carrier is slidably mounted on a copying machine body 100 in a following manner. A pair of guide rails 8 and 9 are fixed to side walls of the copying machine body 100 at the upper end thereof. V-shaped grooves are longitudinally formed on the upper surface of the guide rails 8 and 9, respectively. A guide plate 10 having a longitudinal groove formed thereon is fixed to the inner surface of the leg of the U-shaped metal frame 1 in such a manner that grooves formed on the guide rail 8 and the guide plate 10 confront each other. In addition, a space determining plate 12 is fixed to the inner surface of the other leg of the U-shaped metal frame 1. Another guide plate 11 and another space determining plate 13 are fixed to the inner surface of the legs of the U-shaped metal frame 2, respectively.

Figure 2:
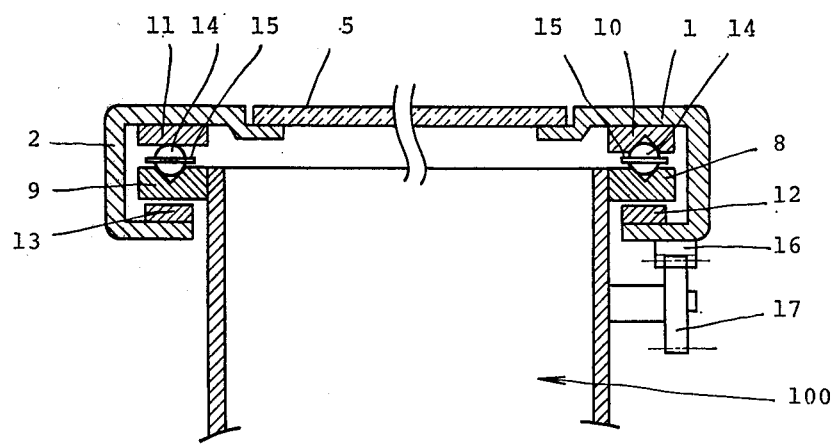
FIG. 2 is a sectional view of the original carrier of FIG. 1.
Figure 3:
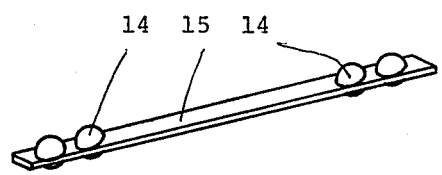
FIG. 3 is a perspective view of a supporting means used in the original carrier of FIG. 1.

Plates 15 rotatably securing rolling balls 14 as shown in FIG. 3 are disposed between the guide rail 8 and the guide plate 10, and between the guide rail 9 and the guide plate 11, respectively, as shown in FIG. 2, thereby allowing the reciprocating travel of the original carrier in the directions shown by the arrow in FIG. 1. Thin gaps are created between the guide rail 8 and the space determining plate 12, and between the guide rail 9 and the space determining plate 13, thereby ensuring smooth travel of the original carrier. A rack 16 is fixed to the bottom wall of the U-shaped metal frame 1, and a driving gear 17 is rotatably secured to the copying machine body 100, whereby the original carrier is driven to reciprocate through the use of suitable driving means (not shown).

The driving gear 17 is driven to rotate both clockwise and counterclockwise by a motor (not shown) via transmission, speed change gear, clutch and reverse mechanisms (not shown), whereby the original carrier is driven to reciprocate via the rack 16. Stoppers 18 are provided at both ends of the guide rails 8, 9 and the guide plate 10, thereby preventing the falling off of the plates 15 during the travel of the oroginal carrier. The space determining plates 12 and 13 function to inhibit the original carrier from being lifted up extremely, and to inhibit the plates 15 from falling off. Moreover, when the original carrier tilts with respect to the copying machine during the travel of the original carrier, the space determining plates 12 and 13 make contact with the guide rails 8 and 9, thereby minimizing the inclination of the original carrier.

In the above-mentioned convention mechanism for transporting the original carrier, the original carrier unavoidably tilts slightly, because the guide plates 10 and 11 are supported by the guide rails 8 and 9 via rolling balls 14, and the space determining plates 12 and 13 are apart from the guide rails 8 and 9 in the normal condition in order to reduce the frictional load. Moreover, the frictional load unavoidably varies when the space determining plates 12 and 13 come into contact with the guide rails 8 and 9, which stabilizes the travel of the original carrier.

Figure 4:
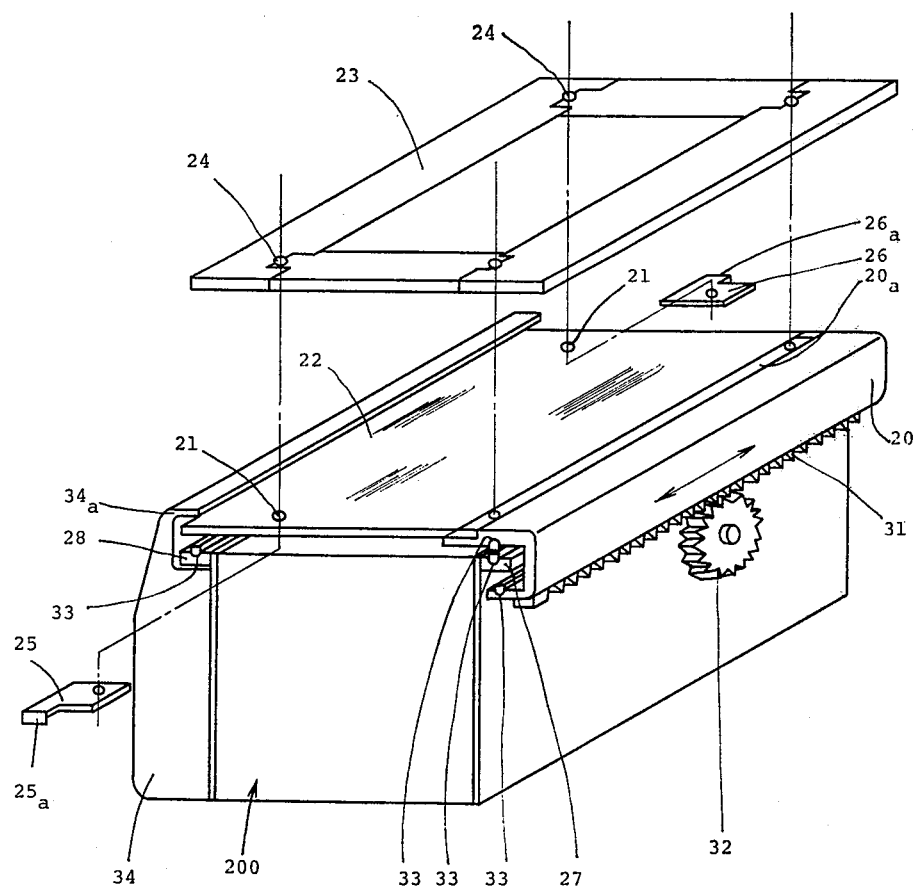
FIG. 4 is a perspective view of an embodiment of an original carrier of the present invention.
Figure 5:
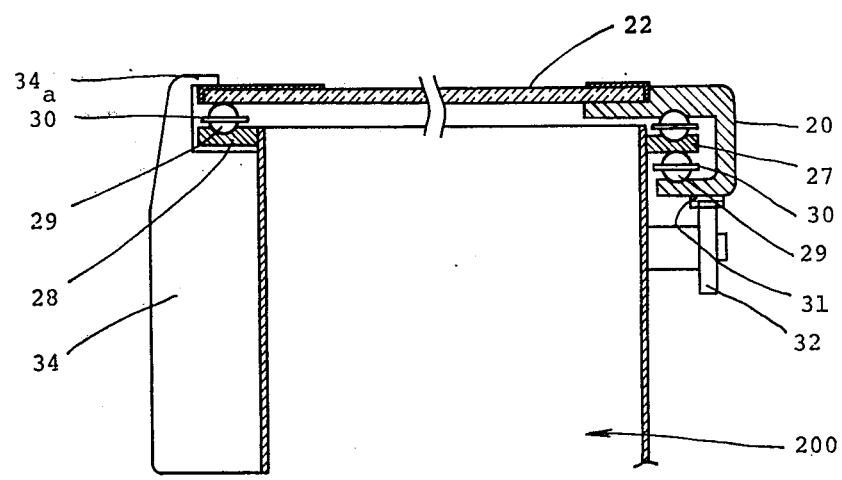
FIG. 5 is a sectional view of the original carrier of FIG. 4.
Figure 6:
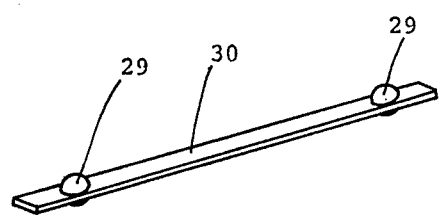
FIG. 6 is a perspective view of an embodiment of a supporting means used in the original carrier of FIG. 4.

FIGS. 4 through 6 show an embodiment of the original carrier of the present invention.

A metal frame 20 made of an aluminum casting having a substantially U-shaped section is fixed to one side edge of a transparent glass platen 22. The transparent glass platen 22 is secured on a stepped portion 20a of the U-shaped metal frame 20. The transparent glass platen 22 is provided with through holes 21 for fixing the transparent glass platen 22 to the U-shaped metal frame 20 through the use of a rectangular cover frame 23. The rectangular cover frame 23 is provided with holes 24 at the positions corresponding to the through holes 21 formed in the transparent glass platen 22. The rectangular cover frame 23 is fixed to the transparent glass platen 22 through the use of stopper angles 25, 26 and screws, and fixed to the stepped portion 20a of the U-shaped metal frame 20 with the intervention of the transparent glass platen 22.

The above constructed original carrier is slidably mounted on a copying machine body 200 in a following manner. A pair of guide rails 27 and 28 are fixed to side walls of the copying machine body 200 at the upper end thereof. U-shaped grooves are longitudinally formed on the upper surface of the guide rails 27 and 28, respectively. Longitudinal U-shaped grooves are formed on the inner surface of the legs of the U-shaped metal frame 20 at the positions corresponding to the U-shaped grooves formed on the guide rail 27. Plates 30 rotatably securing rolling balls 29 made of plastics as shown in FIG. 6 are disposed between the guide rail 27 and the upper leg of the U-shaped metal frame 20, between the guide rail 27 and the bottom leg of the U-shaped metal frame 20, and between the guide rail 28 and the transparent glass platen 22, thereby allowing the reciprocating travel of the original carrier in the directions shown by the arrow in FIG. 4. The rolling balls 29 fit in the U-shaped grooves formed on the guide rails 27, 28 and the U-shaped metal frame 20.

A rack 31 is fixed to the bottom wall of the U-shaped metal frame 20, and a driving gear 32 is rotatably secured to the copying machine body 200, whereby the original carrier is driven to reciprocate in the directions shown by the arrow in FIG. 4 by a motor (not shown) via transmission, speed change gear, clutch and reverse mechanisms (not shown).

The original carrier will not tilt during the travel thereof, because the rolling balls 29 secured by the plates 30 and installed between the transparent glass platen 22 and the guide rail 28, and between the legs of the U-shaped metal frame 20 and the guide rail 27 determine the distance therebetween at a constant value. Moreover, the frictional load is kept at a constant value and, therefore, the travel of the original carrier is stable. In addition, the fabrication of the original carrier is very simple, since the U-shaped metal frame 20 is fixed only one side edge of the transparent glass platen 22.

Stoppers 33 are provided at both ends of the guide rails 27, 28 and U-shaped metal frame 20. And stopper legs 25a and 26a are formed in the stopper angles 25 and 26, respectively. These stoppers function to prevent the falling off of the plates 30 during the travel of the original carrier.

A cabinet 34 is provided at the front side of the copying machine body 200 in such a manner that an angled upper end 34a thereof covers the original carrier via a predetermined gap. This inhibits the original carrier from being lifted up beyond a predetermined range, thereby preventing the falling off of the plates 30 installed between the guide rail 28 and the transparent glass platen 22.

What is claimed is :

1. An electrophotographic copying machine having a reciprocating original carrier, said original carrier comprising:
    a. a transparent platen;
    b. a frame member fixed to only one side edge of the transparent platen;
    c. a pair of guide rails secured to both side walls of the copying machine body;
    d. first supporting means for slidably supporting said frame member on one of said guide rails;
    e. second supporting means for slidably supporting the transparent platen on the other guide rail at the opposite side edge to the side where the frame is fixed; and
    f. means for driving the original carrier to reciprocate said carrier through said frame member.

2. The electrophotographic copying machine of claim 1, wherein the frame member is a metal frame having a substantially U-shaped section and the metal frame is disposed around the guide rail in such a manner to surround said guide rail, and the first supporting means include rolling balls rotatably secured by plates disposed between two legs of the U-shaped metal frame and the guide rail, respectively.

3. The electrophotographic copying machine of claim 2, wherein the second supporting means include rolling balls secured by a plate disposed between the guide rail and the transparent platen.

4. The electrophotographic copying machine of claim 2, wherein the rolling balls are made of plastics.

5. The electrophotographic copying machine of claim 2, wherein the U-shaped metal frame includes a stepped portion on which the transparent platen is mounted, and the transparent platen is fixed to the U-shaped metal frame through the use of a rectangular frame covering the peripheral portion of the transparent platen.

6. The electrophotographic copying machine of claim 5, wherein holes are formed in the rectangular frame, and holes are formed in the transparent platen at positions corresponding to the holes formed in the rectangular frame, whereby the transparent platen is fixed to the stepped portion of the U-shaped metal frame through the use of screws passing through said holes, and the transparent platen is fixed to the rectangular frame through the use of screws passing through said holes.

7. An electrophotographic copying machine having a reciprocating original carrier, said original carrier comprising:
    a. a transparent platen;
    b. a frame member fixed to one side edge of the transparent platen;
    c. a pair of guide rails secured to both side walls of the copying machine body;
    d. first supporting means for slidably supporting said frame member on one of said guide rails;
    e. second supporting means for slidably supporting the transparent platen on the other guide rail at the opposite side edge to the side where the frame is fixed; and f. means for driving the original carrier to reciprocate said carrier through said frame member, said frame member being a metal frame having a substantially U-shaped section and the metal frame is disposed around the guide rail in such a manner to surround said guide rail, said first supporting means including rolling balls rotatably secured by plates disposed between two legs of the U-shaped metal frame and the guide rail, respectively, and wherein a U-shaped longitudinal groove is formed on the upper surface of the guide rail and U-shaped longitudinal grooves are formed on the inner surface of the legs of the U-shaped metal frame at the positions corresponding to the U-shaped groove formed on the guide rail, whereby the rolling balls fit in the U-shaped grooves.

8. The electrophotographic copying machine of claim 7, wherein stoppers are provided at both ends of the respective U-shaped grooves, thereby preventing the falling off of the original carrier during the travel thereof.

9. An electrophotographic copying machine having a reciprocating original carrier, said original carrier comprising:

a. a transparent platen;
b. a frame member fixed to one side edge of the transparent platen;
c. a pair of guide rails secured to both side walls of the copying machine body;
d. first supporting means for slidably supporting said frame member on one of said guide rails;
e. second supporting means for slidably supporting the transparent platen on the other guide rail at the opposite side edge to the side where the frame is fixed; and
f. means for driving the original carrier to reciprocate said carrier through said frame member, said frame member being a metal frame having a substantially U-shaped section and the metal frame is disposed around the guide rail in such a manner to surround said guide rail, said first supporting means including rolling balls rotatably secured by plates disposed between two legs of the U-shaped metal frame and the guide rail, respectively, said U-shaped metal frame including a stepped portion on which the transparent platen is mounted, and the transparent platen is fixed to the U-shaped metal frame through the use of a rectangular frame covering the peripheral portion of the transparent platen, wherein holes are formed in the rectangular frame, and holes are formed in the transparent platen at positions corrsponding to the holes formed in the rectangular frame, whereby the transparent platen is fixed to the stepped portion of the U-shaped metal frame through the use of screws passing through said holes, and the transparent platen is fixed to the rectangular frame through the use of screws passing through said holes, and wherein angled stoppers are fixed to the positions where the transparent platen is fixed to the rectangular frame through the use of said screws, said angled stoppers functioning to prevent the falling off of the original carrier during the travel thereof.

* * * * *